United States Patent
Gesquiere et al.

(10) Patent No.: US 10,299,279 B2
(45) Date of Patent: May 21, 2019

(54) COMMUNICATION SYSTEM FOR USE IN A RAILWAY VEHICLE

(71) Applicant: Televic Rail NV, Izegem (BE)

(72) Inventors: John Gesquiere, Poperinge (BE); Luc Claeys, Tielt (BE); Bart Vercoutter, Bissegem (BE); Kristof Boerjan, Assebroek (BE); Jan Van Den Oudenhoven, Gent (BE)

(73) Assignee: Televic Rail NV, Izegem (BE)

( * ) Notice: Subject to any disclaimer, the term of this patent is extended or adjusted under 35 U.S.C. 154(b) by 0 days.

(21) Appl. No.: 15/311,557

(22) PCT Filed: May 18, 2015

(86) PCT No.: PCT/EP2015/060865
§ 371 (c)(1),
(2) Date: Nov. 16, 2016

(87) PCT Pub. No.: WO2015/173428
PCT Pub. Date: Nov. 19, 2015

(65) Prior Publication Data
US 2017/0142731 A1 May 18, 2017

(30) Foreign Application Priority Data
May 16, 2014 (EP) .................................... 14168731

(51) Int. Cl.
*H04W 72/04* (2009.01)
*H04L 12/40* (2006.01)
(Continued)

(52) U.S. Cl.
CPC ...... *H04W 72/0493* (2013.01); *H04B 1/3822* (2013.01); *H04L 12/40143* (2013.01);
(Continued)

(58) Field of Classification Search
None
See application file for complete search history.

(56) References Cited

U.S. PATENT DOCUMENTS 7,171,003 B1 * 1/2007 Venkatesh ................ H03G 3/32
                                                      381/66
2008/0259945 A1 * 10/2008 Catterall ................. H04L 12/46
                                                      370/404

(Continued)

FOREIGN PATENT DOCUMENTS

EP   1995148 A1   11/2008
GB   07125263    12/2008

OTHER PUBLICATIONS

International Standard IEC 61375-1, Electric railway equipment—Train Bus, Part 1: Train communication network, Second edition, Apr. 2007, pp. 17, 28, 35, 49 and 278.*

(Continued)

*Primary Examiner* — Jamal Javaid
*Assistant Examiner* — Rosene Clark

(57) ABSTRACT

The invention pertains to a communication system for use in a railway vehicle, comprising: a first communication network (10) and a second communication network (20), the communication networks (10, 20) using physically separate communication media; and a plurality of communication terminals (100, 200), each connected to both communication networks (10, 20). The communication system is adapted to prioritize communications from the communication terminals (100, 200) over the communication networks (10, 20) according to at least two levels of service. A first communication terminal (100) comprises a first functional module (110) and a second functional module (120), the functional module (110, 120) being functionally equivalent, the first functional module (110) being adapted to interface with the first communication network (10) and the second functional
(Continued)

module (120) being adapted to interface with the second communication network (20). The functional modules (110, 120) are configured to be simultaneously operational.

13 Claims, 2 Drawing Sheets

(51) Int. Cl.
  *H04W 76/15* (2018.01)
  *H04B 1/3822* (2015.01)
(52) U.S. Cl.
  CPC ....... *H04L 12/40189* (2013.01); *H04W 76/15* (2018.02); *H04L 2012/40293* (2013.01)

(56) References Cited

U.S. PATENT DOCUMENTS

2014/0129061 A1* 5/2014 Cooper .............. B61L 15/0036
                                                          701/19
2016/0339933 A1* 11/2016 Honda ................... B60L 15/42

OTHER PUBLICATIONS

Applicant's Demand for International Preliminary Examination (Chapter II PCT) submitted Mar. 14, 2016 for Application No. PCT/EP2015/060865 filed May 18, 2015.
Applicant's Jun. 13, 2016 Response to International Search Authority Written Opinion dated Apr. 13, 2016 from Application No. PCT/EP2015/060865 filed May 18, 2015.
Extended European Search Report and European Search Report dated Nov. 17, 2014 from European Patent Application No. 14168731.9 filed May 16, 2014.
International Preliminary Report on Patentability dated Jul. 27, 2016 from Application No. PCT/EP2015/060865 filed May 18, 2015.
International Search Report and Written Opinion of the International Search Authority dated Aug. 11, 2015 from Application No. PCT/EP2015/060865 filed May 18, 2015.
Written Opinion of the International Search Authority dated Apr. 13, 2016 from International Application No. PCT/EP2015/060865 filed May 18, 2015.
Australian Patent Office, Examination report No. 1 in Australian Application No. 2015261383, dated Aug. 8, 2018.

* cited by examiner

COMMUNICATION SYSTEM FOR USE IN A RAILWAY VEHICLE

FIELD OF THE INVENTION

The present invention relates to communication systems which may be used in railway vehicles.

BACKGROUND

An example of a packet-based railway vehicle network is disclosed in EP 1 694 035 A1 in the name of Televic NV.

The known communication systems do not offer sufficient resilience against failures of network equipment or terminals.

It is therefore an object of embodiments of the present invention to provide improved resilience against failures of network equipment or terminals.

SUMMARY OF THE INVENTION

According to an aspect of the present invention, there is provided a communication system for use in a railway vehicle, the communication system comprising: a first communication network and a second communication network, the first communication network and the second communication network using physically separate communication media; and a plurality of communication terminals, each connected to both the first communication network and the second communication network; wherein the communication system is adapted to prioritise communications from the plurality of communication terminals over the first communication network and the second communication network according to at least two levels of service; wherein a first communication terminal from among the plurality of communication terminals comprises a first functional module and a second functional module, the first functional module and the second functional module being functionally equivalent, the first functional module being adapted to interface with the first communication network and the second functional module being adapted to interface with the second communication network; and wherein the first functional module and the second functional module are configured to be simultaneously operational.

The term "terminal" is used in a functional sense, and is not necessarily limited to equipment contained in a single housing.

It is an advantage of the use of parallel and simultaneously operational functional module pairs, that an immediate and automatic "fall-back" is available in the event of a failure (for the avoidance of doubt, the term "fall-back" is not meant to imply that one of the functional modules is normally inactive or in stand-by mode, to be activated only in the event of a failure of its counterpart; on the contrary, in the present invention, both functional modules are configured to be normally active). It is a further advantage that a high-quality and service-oriented digital network infrastructure can be combined with a well-known and trusted analog network infrastructure to provide both novel and legacy functions, while ensuring redundancy for the most critical communications. These most critical communications (also referred to as "level 1" communications) are differentiated from other communications by a priority level that is either signalled along with the actual communication, or registered by a centralized unit controller during session set-up.

In an embodiment of the communication system according to the present invention, a second communication terminal from among the plurality of communication terminals comprises third functional module and a fourth functional module, the third functional module and the fourth functional module being functionally equivalent and complementary to the first functional module and the second functional module, the third functional module being adapted to interface with the first communication network and the fourth functional module being adapted to interface with the second communication network; and the third functional module and the fourth functional module are configured to be simultaneously operational.

It is an advantage of this embodiment that full redundancy can be provided over a path between a first terminal and a second terminal (which path could be bidirectional or unidirectional in either direction), making optimal use of the first communication network and the second communication network.

In an embodiment of the communication system according to the present invention, the first functional module and the second functional module comprise tactile, visual, and/or auditory user interface elements.

It is an advantage of this embodiment that the necessary user interface functions required for the safe and comfortable management and control of selected functions of the railway vehicle can be offered by the terminals.

In an embodiment of the communication system according to the present invention, said first functional module and said second functional module each comprise an audio conversion device, such as a microphone or a speaker.

Audio-related functional modules may include means for capturing, amplifying, equalizing, and/or reproducing sound. It is a surprising advantage of this embodiment that functional redundancy can be obtained by using audio streams transmitted in parallel, without compromising the intelligibility of the speech. Indeed, experiments conducted by the inventors have shown that the small delay that normally occurs between the reproduced audio streams may cause a certain degree of audible reverberation, but no will not cause speech-destroying doubletalk.

In a particular embodiment, an additional delay is introduced in a signal processed by said second functional module.

It is an advantage of this embodiment that good speech quality can be retained even in configurations that suffer from a larger amount of relative delay between the reproduced audio streams.

In a more particular embodiment, the first communication terminal is adapted to determine a difference in time of receipt of respective equivalent signals over said first communication network and the second communication network, and to determine the additional delay according to the determined difference.

It is an advantage of this particular embodiment that the necessary correction of the audio streams occurs automatically.

In an embodiment of the communication system according to the present invention, the first functional module and the second functional module each comprise a speaker, and the first functional module and the second functional module are operatively coupled to allow simultaneous reproduction of an audio signal received by the first functional module through the respective speakers of the first functional module and the second functional module.

It is an advantage of this embodiment that non-critical audio transmissions may be relayed by the first communication network alone, while still allowing sound reproduction at full volume by using the functional modules connected to both networks.

In an embodiment of the communication system according to the present invention, the communication network is an Internet Protocol based digital network.

The Internet Protocol (IP) has proven to be a very flexible and reliable protocol at the network layer. Its widespread implementation makes it an economically and technically safe and attractive choice.

In a particular embodiment, the at least two levels of service are labelled on the first communication network by means of Type-of-Service (ToS) bits.

It is an advantage of this embodiment that a native IP field can be used for service differentiation, which ensures a maximal degree of compatibility with existing IP-based equipment.

In an embodiment of the communication system according to the present invention, the communication network uses an IEEE 802.1-based data link layer, and wherein the at least two levels of service are labelled on the first communication network by means of IEEE 802.1p bits. In an embodiment of the communication system according to the present invention, the communication network uses an IEEE 802.1-based data link layer, and wherein the at least two levels of service are labelled on the first communication network by means of VLAN tags.

The IEEE 802 suite, including "Ethernet", has proven to be a very flexible and reliable protocol suite at the data link layer. Its widespread implementation makes it an economically and technically safe and attractive choice. It is an advantage of these embodiments that native fields can be used for service differentiation, which ensures a maximal degree of compatibility with existing Ethernet-based equipment.

In an embodiment of the communication system according to the present invention, the second communication network is an analog network. In a particular embodiment, the second communication network is an International Union of Railways (UIC) network.

These networking technologies have been used extensively in railway vehicles; it is an advantage of these embodiments that they provide a certain degree of backward compatibility with legacy equipment.

In an embodiment of the communication system according to the present invention, the first communication terminal further comprises fault detection means adapted to verify the correct operation of the first functional module and the second functional module. In a particular embodiment, the fault detection means operates by comparing an output of the first functional module to an output of the second functional module.

Although operational continuity is guaranteed under "single point of failure" conditions by the redundancy provided by the invention, it is an additional advantage of these embodiments that an alert can be generated when a failure occurs, such that the user of the affected function is alerted to the failure, allowing him to take any relevant measures, and the necessary maintenance or repair can be scheduled.

In an embodiment of the communication system according to the present invention, the second communication network further comprises processing means configured to detect a transmission invoking a high priority level from among the at least two levels of service, and to transmit a detection signal to the first communication network upon the detecting.

It is an advantage of this embodiment that any lower-priority transmissions only occurring on the first communication network can be suitably interrupted when a "level 1" communication is initiated from a terminal (module) on the second communication network. The mere fact that a critical communication occurs on the second network without also occurring on the first network may be interpreted as a fault condition, and give rise to an appropriate alert.

In an embodiment of the communication system according to the present invention, the first communication network further comprises a controller configured to receive session requests from the plurality of communication terminals and to grant or refuse requested sessions according to rules that enforce the at least two levels of service.

It is an advantage of this embodiment that all communications on the first communication network can be centrally controlled, such that complex prioritisation policies can be implemented. In systems where the detection of critical communication on the second communication network is signalled to the first communication network (as described in connection with the previous embodiment), such signal may be sent to the controller of the present embodiment.

According to an aspect of the present invention, there is provided a railway vehicle comprising a network system as described above.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
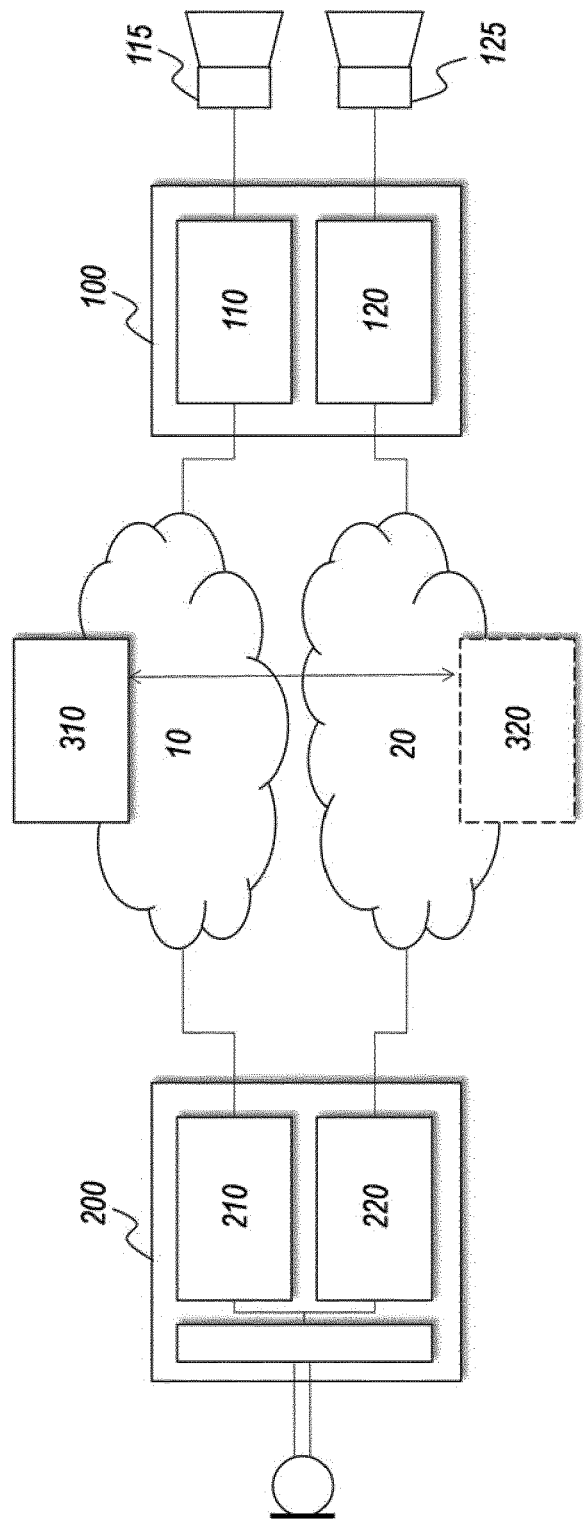
FIG. 1 schematically illustrates a communication system according to an embodiment of the present invention.

The communication system illustrated in FIG. 1 may be used in a railway vehicle. As railway vehicles are composed of a variable number of carriages, the physical interfaces of the communication system and the associated protocols are preferably designed in such a way that they allow "on the fly" modular extension of the network as carriages are added. An example of a packet-based railway vehicle network is disclosed in EP 1 694 035 A1 in the name of Televic NV.

The communication system according to the present invention comprises at least a first communication network 10 and a second communication network 20, which use mutually physically separate communication media, e.g. separate sets of wires and switches, or a wired infrastructure and a wireless infrastructure. A plurality of communication terminals 100, 200 are each connected to both the first communication network 10 and the second communication network 20. Without loss of generality, just two communication terminals 100, 200 are shown in FIG. 1.

The communication system is adapted to prioritise the transfer of communications from the plurality of communication terminals 100, 200 over the first communication network 10 and the second communication network 20 according to at least two levels of service. These levels of service may be signalled in a variety of ways. If the first communication network 10 is a packet-based network, such as an IP network using an IEEE 802.1-based data link layer (e.g., Ethernet), the service levels may for instance be indicated as Type-of-Service (ToS) bits, IEEE 802.1p bits, or VLAN IDs. Alternatively or additionally, a vendor-proprietary field may be used to distinguish the "level 1" communications from the "level 2" communications.

Generally, the first communication network 10 is a high-performance digital network, which carries the less-critical ("level 2"), value-added services (for example, in-train entertainment and non-critical passenger information, crew announcements). These "level 2" communications are managed by a controller 310 which grants (or refuses) bandwidth to the requesting terminals in accordance with predetermined policies.

The policies should include a rule to refuse any bandwidth requests above the level at which proper transmission of "level 1" communications can still be guaranteed, whenever a "level 1" communication is active. Any bandwidth requests or allocations related to "level 2" communications should yield to "level 1" communications. Accordingly, ongoing "level 2" communications may be aborted when the start of a "level 1" communication is detected; the start of any "level 1" communication on the second communication network 20 is preferably always communicated to the controller 310 of the first communication network 10 for this purpose.

The initiation of communication sessions may be signalled by the controller 310 to other network nodes on the first communication network 10, to allow the latter to adapt their behaviour in view of the initiated session. In this case, the prioritisation of "level 1" communications over "level 2" communications, and optionally even of various kinds of "level 2" communications relative to each other, may be achieved by controlling the behaviour of the terminals, without the need for in-band signalling of the priority of individual communications (i.e. without the need for the ToS bits, 802.1p-bits, VLAN tags etc. mentioned above).

The digital first communication network 10 may also be used to exchange diagnostics information, including diagnostics related to the second communication network 20 (e.g. information about the initiation or presence of test sequences on the second communication network).

The second network 20 is preferably an analog network, optionally an International Union of Railways (UIC) network, which is known in the domain of railway vehicle networks. However, it is also possible to use a different type of analog network, which gives the implementer more freedom to add custom services over this network. Furthermore, it is also possible to use a second digital network, which provides maximum service implementation flexibility and facilitates interconnection between railway carriages. Without loss of generality, the description below shall assume that the second network 20 is an analog network.

At least a first communication terminal 100 from among the plurality of communication terminals comprises two functionally equivalent functional modules 110, 120, i.e. a first functional module 110 and a second functional module 120, adapted to interface with the first communication network 10 and the second communication network 20, respectively. The first functional module 110 and the second functional module 120 are configured to be simultaneously operational. This means that, at any given time, a single failure in one of the functional modules 110, 120 or one of the communication networks 10, 20 will simply cause the system to continue operating on the basis of the functional module that is still operational and that still has connectivity, without any discontinuity in the operation. The functions provided by the functional modules 110, 120 contribute to the various functions required for the safe and comfortable management and control of selected functions of the railway vehicle, and may in particular include user interface elements that may be tactile (buttons, touch screens, etc.), visual (displays, lights, gauges, etc.), and/or auditory (microphones, speakers, buzzers, etc.).

As indicated in FIG. 1, a second communication terminal 200 from among the plurality of communication terminals may also comprise two functionally equivalent functional modules 210, 220, adapted to interface with the first communication network 10 and the second communication network 20, respectively. These functional modules 210, 220 may provide the same functions as those described above in connection with functional modules 110, 120. Again, these functional modules 210, 220 are configured to be simultaneously operational, so as to provide redundancy in the way described above.

It must be noted that the communication system may further include terminals (not shown) that have only one functional module. This may be done for cost reasons, where the provided functions are not sufficiently critical to justify the investment in full redundancy. This may for instance be the case for a crew handset, which may be connected to the (digital) first network 10 only.

Where the two functional modules 110, 120 of a communication terminal—for example, the first communication terminal 100—each comprise a speaker as an audio conversion device 115, 125, both speakers normally receive the same signal via the respective communication networks 10, 20. The full desired sound volume is obtained when both chains (source—communication network—functional module including speaker) are completely operational. When either chain is affected by a single point of failure, the remaining chain will continue to operate, leading only to a 3 dB decrease in sound volume. To optimize the quality of the combined sound when both chains are operational, an additional delay may be introduced in the signal processed by the second functional module 120, to compensate for the relative delay introduced by the first network 10. Experiments reported in literature have shown that the total difference in delay between the two simultaneously reproduced sound streams should preferably remain below 50 ms; the inventors have found that the best results are obtained with a maximum delay difference of 30 ms, preferably 20 ms, and most preferably 15 ms. The necessary amount of additional delay to be injected may be determined by the first communication terminal 100 on the basis of a measured difference in time of receipt of respective equivalent signals over the first communication network 10 and the second communication network 20.

Figure 2:
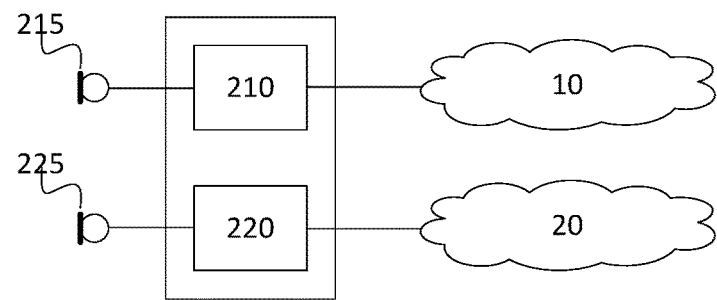
FIG. 2 schematically illustrates variants of a terminal for use in an embodiment of the present invention.
Figure 2:
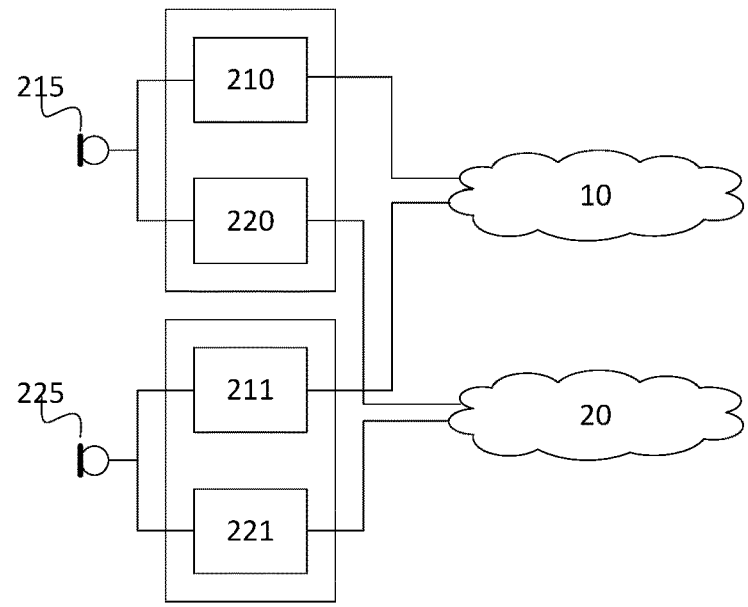
Figure 2:
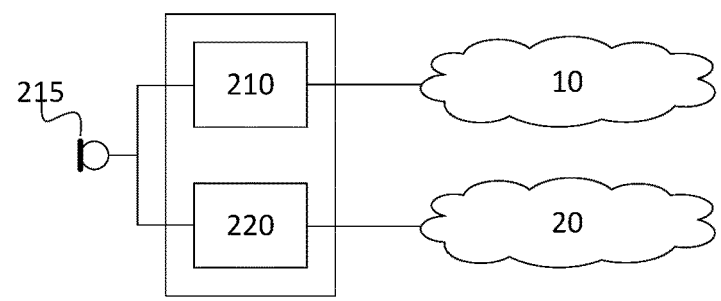

The source (microphone) side 200 may be set up in various ways, as illustrated in FIG. 2.

A first set-up (FIG. 2, top) is fully analogous to what has been described above for the reproduction side, and consists of using separate parallel microphone elements 215, 225 (for instance, dashboard-mounted microphones) included in the respective functional modules 210, 220. However, this solution may prove impractical in other arrangements, in particular when using gooseneck microphones. A variation of this set-up consists of the use of a single microphone housing which includes two microphone cells that are associated with respective functional modules.

A second set-up (FIG. 2, centre) consists of the use of two terminals 200, 201 at the source side, each of which has a single microphone which is attached to both of its functional modules 210, 220 or 211, 221. In this way, the terminals transmit the microphone's signal via both the first communication network 10 and the second communication network 20. Thus, the system is robust against a failure of one of the microphones 215, 225, and against a failure of one of the networks 10, 20.

To avoid the parallel connection of the microphones, it is also possible to use two terminals 200, 201 at the source side, one of which 200 has its microphone 215 attached to the functional module 210 communicating via the first communication network 10 and one of which 201 has its microphone 225 attached to the functional module 221 communicating via the second communication network 20.

A third set-up consists of using a single microphone 215 whose signal is relayed by two functional modules 210, 220 (FIG. 2, bottom; this is also the case illustrated in FIG. 1). This corresponds to the top half of the previous set-up. Thus, redundancy in view of a network failure is retained, but the microphone becomes a single vulnerability.

When non-critical audio transmissions are transmitted over the first network 10 only, the arrangement described above would cause the sound signal to be reproduced through the first functional module 210 only. To avoid having the sound reproduced at only half of the normal volume, the first functional module 210 and the second functional module 220 may be operatively interconnected in such a way as to allow the same signal to be reproduced through both audio front-ends.

While the use of parallel and simultaneously operational functional module pairs implies an immediate and automatic fall-back in the event of a failure, it is preferred to include in the first communication terminal 100 a fault detection means to verify the correct operation of the first functional module 110 and the second functional module 120. This fault detection means may operate by comparing an output of the first functional module 110 to an output of the second functional module 120.

The second communication network 20 may further be provided with processing means configured to detect a transmission invoking a high priority level from among the at least two levels of service, and to transmit a detection signal to the first communication network 10 upon the detecting. This processing means may be present in an optional centralized unit controller 320 that manages the transmissions on the second network 20, or at control elements distributed over the individual terminals 100, 200. The first network 10 processes this detection signal at an optional centralized unit controller 310 that manages the "level 2" transmissions on the first network 10, or at control elements distributed over the individual terminals 100, 200.

The functions described hereinabove as pertaining to the fault detection means or to the processing means configured to detect a transmission may be implemented in dedicated hardware (e.g., ASIC), configurable hardware (e.g., FPGA), programmable components (e.g., a DSP or general purpose processor with appropriate software), or any combination thereof. The same component(s) may also include other functions (for instance, functions associated with the "unit controller" described above). The present invention also pertains to a railway vehicle comprising the network system described above.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

The invention claimed is:

1. A communication system for use in a railway vehicle, the communication system comprising:
   a first communication network and a second communication network, said first communication network and said second communication network using physically separate communication media; and
   a plurality of communication terminals, each connected to both said first communication network and said second communication network;
   wherein the communication system is adapted to prioritise communications from said plurality of communication terminals over said first communication network and said second communication network according to at least two levels of service;
   wherein a first communication terminal from among said plurality of communication terminals comprises a first functional module and a second functional module, wherein each of said first functional module and said second functional module comprises at least one of a tactile user interface element, a visual user interface element, or an auditory user interface element, said first functional module and said second functional module being functionally equivalent,
   said first functional module being adapted to interface with said first communication network and said second functional module being adapted to interface with said second communication network;
   wherein said first functional module and said second functional module are configured to be simultaneously operational;
   wherein an additional delay is introduced in a signal processed by said second functional module; and
   wherein said first communication terminal is adapted to determine a difference in time of receipt of respective equivalent signals over said first communication network and said second communication network, and to determine said additional delay according to said determined difference.

2. The communication system according to claim 1, wherein a second communication terminal from among said plurality of communication terminals comprises a third functional module and a fourth functional module,
   said third functional module and said fourth functional module being functionally equivalent and complementary to said first functional module and said second functional module,
   said third functional module being adapted to interface with said first communication network and said fourth functional module being adapted to interface with said second communication network; and
   wherein said third functional module and said fourth functional module are configured to be simultaneously operational.

3. The communication system according to claim 1, wherein said first functional module and said second functional module each comprise an audio conversion device.

4. The communication system according to claim 3, wherein said first functional module and said second functional module each comprise a speaker, and wherein said first functional module and said second functional module are operatively coupled to allow simultaneous reproduction of an audio signal received by said first functional module through the respective speakers of said first functional module and said second functional module.

5. The communication system according to claim 1, wherein said first communication network is an Internet Protocol based digital network.

6. The communication system according to claim 1, wherein said second communication network is an analog network.

7. The communication system according to claim 6, wherein said second communication network is an International Union of Railways (UIC) network.

8. The communication system according to claim 1, wherein said first communication terminal further comprises fault detection means adapted to verify the correct operation of said first functional module and said second functional module.

9. The communication system according to claim 8, wherein said fault detection means operates by comparing an output of said first functional module to an output of said second functional module.

10. The communication system according to claim 1, wherein said second communication network further comprises processing means configured to detect a transmission invoking a high priority level from among said at least two levels of service, and to transmit a detection signal to said first communication network upon said detecting.

11. The communication system according to claim 1, wherein said first communication network further comprises a controller configured to receive session requests from said plurality of communication terminals and to grant or refuse requested sessions according to rules that enforce said at least two levels of service.

12. A railway vehicle comprising the network system according to claim 1.

13. The communication system according to claim 3, wherein the audio conversion device comprises a microphone or a speaker.

* * * * *